United States Patent Office 3,264,230
Patented August 2, 1966

3,264,230
EPOXIDE COMPOSITIONS CONTAINING TIN CURING CATALYSTS
William R. Proops, Charleston, W. Va., assignor to Union Carbide Corporation, a corporation of New York
No Drawing. Filed Dec. 29, 1961, Ser. No. 163,049
17 Claims. (Cl. 260—2)

This invention relates to epoxide compositions and to the curing of certain epoxides with tetravalent tin catalysts.

A variety of catalysts have been suggested for use in promoting the cure or polymerization of epoxide compositions into hardened, infusible and insoluble products of relatively high molecular weight, the cured epoxy compound being either in the form of a homopolymer or copolymer with various organic compounds capable of interaction with the active groups of the epoxide. Included among the known catalysts are strongly acidic materials such as sulfuric acid, phosphoric acid, etc.; aromatic sulfonic acids such as toluenesulfonic acid and benzenesulfonic acid; Lewis acids, e.g., boron trifluoride, stannic chloride, etc.; and boron trifluoride-amine complexes such as boron trifluoride-monoethylamine, boron trifluoride-piperidine, and the like. Although these catalysts are effective for the curing or polymerization process, their use has been handicapped to some extent due to a number of reasons. For example, the use of Lewis acid catalysts such as boron trifluoride suffer the disadvantages of effecting rapid and uncontrolled exotherms during the cure of epoxides to resins, frequently causing thermal decomposition in the composition as evidenced by charring, or expulsion of components as indicated by bubble formation and foaming. A number of these catalysts are of a corrosive nature and cause uncontrollable gel rates in the cure of certain epoxide formulations which thus seriously limits their industrial application in the field of coatings, adhesives, and potting compositions.

The present invention is based on the discovery that tetravalent tin compounds of the class of stannic mercaptides are especially effective catalysts for promoting the cure of epoxide compositions. It has been found that the incorporation of stannic mercaptides in epoxide compounds provides curable compositions which have a good working life and can be cured at room temperature without incurring rapid gelation or uncontrollable exotherms. The curable compositions can be spread, brushed or sprayed by techniques known in the paint, varnish and lacquer industries, and can be advantageously used in the encapsulation of electrical components. In one aspect, mixtures of stannic mercaptide catalysts with epoxides containing the cyclohexene oxide or cyclopentene oxide group offer a distinct advantage over epoxides of the polyglycidyl ether type inasmuch as they can be reacted with various hardeners and foamed by internal development of carbon dioxide or by blowing agent which vaporizes at or below the temperature of the foaming mass to provide foamed polymers of widely varying and preselected properties. Foamed polymers of this type find wide utility in the field of structural reinforcement and insulation.

The stannic mercaptides which are used may be represented by the formula:

$$Sn(SR)_4$$

wherein R is a monovalent hydrocarbon radical, saturated or unsaturated, branched chain or straight chain, containing 1 to 18 carbon atoms, preferably 1 to 12. Representative examples of stannic mercaptides include stannic methyl mercaptide, stannic propyl mercaptide, stannic isopropyl mercaptide, stannic butyl mercaptide, stannic t-butyl mercaptide, stannic amyl mercaptide, stannic t-amyl mercaptide, stannic 2-ethylhexyl mercaptide, stannic t-heptyl mercaptide, stannic n-octyl mercaptide, stannic tridecyl mercaptide, stannic heptadecyl mercaptide, stannic phenyl mercaptide, and the like.

The stannic catalysts may be substituted in the hydrocarbon radical with hydroxy, halo, keto and similar groups.

The stannic mercaptides may be made by an exchange reaction of a stannic alkoxide, such as stannic t-amyloxide, with a thiol to form the mercaptide and the corresponding alcohol of the stannic alkoxide. The stannic alkoxides may be made by the method of D. C. Bradley, E. V. Caldwell and W. Wardlaw, J. Chem. Soc., 4775 (1957).

Thus the aforementioned stannic mercaptides can be prepared by an exchange reaction of, for example, stannic t-amyloxide, with methanethiol, propanethiol, isopropanethiol, 1-butanethiol, t-butylthiol, pentanethiol, t-pentanethiol, 2-ethylhexanethiol, t-heptanethiol, n-octanethiol, tridecanethiol, heptadecanethiol, benzenethiol, and the like.

In a preferred embodiment, the catalysts of the instant invention are prepared by forming a mixture of stannic t-amyloxide and the appropriate mercaptan in a suitable anhydrous media such as toluene. Thereafter the mixture is maintained at a temperature and for a period of time sufficient to complete the exchange reaction. In most instances, a temperature of from about 90° to about 110° C. was found to be sufficient. The toluene and the t-amyl alcohol formed are then distilled off leaving the stannic mercaptide as a residue.

In carrying out the invention, the stannic catalysts are mixed with epoxides to obtain a homogeneous curable composition. With epoxides that are liquid and viscous, the catalyst can be simply admixed with the epoxide by conventional means as, for example, by stirrers and impellers, etc. When the catalyst and epoxide are immiscible at room temperatures, or if the epoxide is normally solid, the epoxide can be melted or mixed with a liquid organic solvent. Typical solvents include organic ethers such as diethyl ether, methyl propyl ether, etc.; organic esters such as methyl acetate, ethyl propionate, etc.; and organic ketones such as acetone and cyclohexanone, etc.

The amount of catalyst employed will vary with the cure rate desired and the curing temperature employed. As a general guide good results are obtained by utilizing the stannic catalyst in amounts ranging between 0.001 and 20 percent, preferably 0.1 to 10 percent, by weight, based on the total weight of the curable epoxide composition.

The mixture of epoxide composition and catalyst can be cured over a wide temperature range. For example, the catalyst can be added to the epoxide composition at room temperatures, i.e., about 15° C. to 25° C., and the cure effected, or if a rapid cure is desired, the mixture can be heated to temperatures as high as 250° C. or more. Higher temperatures above 250° C. are generally undesirable due to the discoloration which may be induced. Other single curing temperatures and combinations of curing temperatures can be employed as desired.

The stannic catalysts described above are used to promote the cure of a wide variety of known monoepoxide and polyepoxide compositions, the cured composition produced being in the form of a homopolymer, or copolymer with an active organic hardener. The curable epoxide compositions can be monomeric or polymeric, saturated or unsaturated, aliphatic, aromatic or heterocyclic, and can be substituted, if desired, with substituents such as hydroxy, halide, alkyl, aryl, carboxyl, and the like. Thus, for example, the instant invention contemplates the preparation of homopolymers and copolymers of monoepoxides and polyepoxides containing cyclohexene oxide, cyclopentene oxide, bicycloheptene oxide, and cyclooctene oxide groups. Also included are the epoxidized alkenes, the glycidyl ethers of polyhydric phenols and alcohols, epoxidized polybutadiene, epoxidized copolymers of butadiene, epoxidized natural oils, and the like.

In one embodiment of the instant invention the monomeric polyepoxides which can be cured with the stannic catalysts contain at least two oxirane oxygen atoms, at least one of which is bonded to two vicinal cycloaliphatic carbon atoms. The other oxygen atom is also bonded to two vicinal carbon atoms, but the carbon atoms need not necessarily form part of a cycloaliphatic ring. Thus, the polyepoxide component contains at least two vicinal epoxy groups, i.e.,

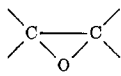

the epoxy carbon atoms of at least one of the groups forming a portion of a cycloaliphatic hydrocarbon nucleus. The cycloaliphatic nucleus preferably contains from 4 to 8 carbon atoms including the epoxy carbon atoms, and preferably from 5 to 7 carbon atoms.

Diepoxides which contain both oxirane oxygen atoms bonded to cycloaliphatic carbon atoms are highly preferred. Polyepoxides which contain solely carbon, hydrogen, and oxygen atoms are especially preferred. The oxygen atoms can be (in addition to oxirane oxygen) etheric oxygen, i.e., —O—; oxygen present in an ester group, i.e.,

oxygen present in a carbonyl group, i.e.,

and the like. A single polyepoxide or a mixture of at least two polyepoxides can be employed in the novel curable compositions.

Illustrative polyepoxides include, for example,

The alkanediol bis(3,4-epoxycyclohexanecarboxylates),
The alkenediol bis(3,4-epoxycyclohexanecarboxylates),
The alkanediol bis(lower alkyl substituted-3,4-epoxycyclohexanecarboxylates),
The oxaalkanediol bis(lower alkyl substituted-3,4-epoxycyclohexanecarboxylates),
The alkanetriol tris(3,4-epoxycyclohexanecarboxylates),
The alkenetriol tris(3,4-epoxycyclohexanecarboxylates),
The alkanetriol tris(lower alkyl substituted-3,4-epoxycyclohexanecarboxylates),
The oxaalkanetriol tris(3,4-epoxycyclohexanecarboxylates),
The oxaalkanetriol tris(lower alkyl substituted-3,4-epoxycyclohexanecarboxylates), and the like.

The above-illustrated polyol poly(3,4-epoxycyclohexanecarboxylates) can be prepared by epoxidizing the corresponding polyol poly(cyclohexenecarboxylate) with at least a stoichiometric quantity of peracetic acid (preferably contained as solution in ethyl acetate) per carbon to carbon double bond of said polyol poly(cyclohexenecarboxylate), at a temperature in the range of from about 25° to 90° C., for a period of time sufficient to introduce oxirane oxygen at the sites of all the carbon to carbon double bonds contained in the polyol poly(cyclohexenecarboxylate) reagent. The polyol poly (cyclohexenecarboxylates), in turn, can be prepared in accordance with well known condensation techniques, e.g., the esterification of a Polyol, e.g., ethylene glycol,
Diethylene glycol,
Triethylene glycol,
Tetraethylene glycol,
1,2-propylene glycol,
1,3,-propylene glycol,
The polyoxyethylene glycols,
1,4-butanediol,
1,5-pentanediol,
1,6-hexanediol,
The octanediols,
The octadecanediols,
The butenediols,
The pentenediols,
The hexenediols,
The octenediols,
1,2,3-propanetriol,
Trimethylolmethane,
1,1,1-trimethylolethane,
1,1,1-trimethylolpropane,
1,2,6-hexanetriol,
Cycloaliphatic triols,
Aromatic triols, and the like;

with a 3-cyclohexenecarboxylic acid, e.g., 3-cyclohexenecarboxylic acid, lower alkyl substituted-3-cyclohexenecarboxylic acid, and the like. The expression "lower alkyl," as used in the disclosure, means an alkyl radical which contains from 1 to 4 carbon atoms.

Other polyepoxides contemplated include, for instance, the bis(3,4-epoxyclclohexylmethyl) hydrocarbon dicarboxylates and the bis(lower alkyl substituted-3,4-epoxycyclohexylmethyl) hydrocarbon dicarboxylates, e.g., Bis(3,4-epoxycyclohexylmethyl)oxalate,
Bis(3,4-epoxycyclohexylmethyl)malonate,
Bis(3,4-epoxycyclohexylmethyl)succinate,
Bis(3,4-epoxycyclohexylmethyl)glutarate,
Bis(3,4-epoxycyclohexylmethyl)adipate,
Bis(3,4-epoxycyclohexylmethyl)maleate,
Bis(3,4-epoxycyclohexylmethyl)tetrahydrophthalate,
Bis(3,4-epoxycyclohexylmethyl)citraconate,
Bis(3,4-epoxycyclohexylmethyl)isocitraconate,
Bis(3,4-epoxy-6-methylcyclohexylmethyl)fumarate,
Bis(3,4-epoxycyclohexylmethyl)pimelate,
Bis(3,4-epoxycyclohexylmethyl)terephthalate,
Bis(3,4-epoxycyclohexylmethyl)azelate,
Bis(3,4-epoxycyclohexylmethyl)sebacate,
Bis(3,4-epoxycyclohexylmethyl)itaconate,
Bis(3,4-epoxycyclohexylmethyl)hexahydrophthalate,
Bis(3,4-epoxycyclohexylmethyl)phthalate,
Bis(3,4-epoxycyclohexylmethyl)glutaconate,
Bis(3,4-epoxycyclohexylmethyl)hydromuconate, and the like.

Other desirable polyepoxides includes the monoesters of 3,4-epoxycyclohexylmethanols and 3,4-epoxycyclohexanecarboxylic acids such as, for example, 3,4-epoxycyclohexylmethyl 3,4-epoxycyclohexanecarboxylate,
1-methyl-3,4-epoxycyclohexylmethyl 1-methyl-3,4-epoxycyclohexanecarboxylate,
6-methyl-3,4-epoxycyclohexylmethyl 6-methyl-3,4-epoxycyclohexanecarboxylate,
2-ethyl-3,4-epoxycyclohexylmethyl 2-ethyl-3,4-epoxycyclohexanecarboxylate,
4-n-propyl-3,4-epoxycyclohexylmethyl 4-n-propyl-3,4-epoxycyclohexanecarboxylate, 5-isobutyl-3,4-epoxycyclohexylmethyl 5-isobutyl-3,4-
 epoxycyclohexanecarboxylate,
Lower alkyl substituted-3,4-epoxycyclohexylmethyl,
Lower alkyl substituted-3,4-epoxycyclohexanecarboxylate,
Halo substituted-3,4-epoxycyclohexylmethyl halo substituted-3,4-epoxycyclohexanecarboxylate,
1-chloro-3,4-epoxycyclohexylmethyl 1-chloro-3,4-
 epoxycyclohexanecarboxylate,
2-bromo-3,4-epoxycyclohexylmethyl,
2-bromo-3,4-epoxycyclohexanecarboxylate, and the like.
2-bromo-3,4-epoxycyclohexylmethyl 2-bromo-3,4-epoxycyclohexanecarboxylate, and the like.

Still other desirable polyepoxides include, by way of illustration,

The 3-oxatetracyclo[4.4.0.1$^{7,10}$.0$^{2,4}$]undec-8-yl vicinal-
 epoxyalkyl ethers,
The 3-oxatetracyclo[4.4.0.1$^{7,10}$.0$^{2,4}$]undec-8-yl vicinal-
 epoxycycloalkyl ethers,
The 3-oxatetracyclo[4.4.0.1$^{7,10}$.0$^{2,4}$]undec-8-yl vicinal-
 epoxycycloalkylalkyl ethers,
The 3-oxatetracyclo[4.4.0.1$^{7,10}$.0$^{2,4}$]undec-8-yl 3-oxatricyclo[3.2.1.0$^{2,4}$]oct-6-yl-ethers,
The 3-oxatetracyclo[4.4.0.1$^{7,10}$.0$^{2,4}$]undec-8-yl 3-oxatricyclo[3.2.1.0$^{2,4}$]oct-6-yl alkyl ethers, and the like.

Specific examples include
3-oxatetracyclo[4.4.0.1$^{7,10}$.0$^{2,4}$]undec-8-yl
 2,3-epoxypropyl ether,
3-oxatetracyclo[4.4.0.1$^{7,10}$.0$^{2,4}$]undec-8-yl
 3,4-epoxybutyl ether,
3-oxatetracyclo[4.4.0.1$^{7,10}$.0$^{2,4}$]undec-8-yl
 2,3-epoxybutyl ether,
3-oxatetracyclo[4.4.0.1$^{7,10}$.0$^{2,4}$]undec-8-yl
 3,4-epoxyhexyl ether,
3-oxatetracyclo[4.4.0.1$^{7,10}$.0$^{2,4}$]undec-8-yl
 5,6-epoxyhexyl ether,
3-oxatetracyclo[4.4.0.1$^{7,10}$.0$^{2,4}$]undec-8-yl
 7,8-epoxyoctyl ether,
3-oxatetracyclo[4.4.0.1$^{7,10}$.0$^{2,4}$]undec-8-yl
 2-methyl-2,3-epoxypropyl ether,
3-oxatetracyclo[4.4.0.1$^{7,10}$.0$^{2,4}$]undec-8-yl
 9,10-epoxystearyl ether,
3-oxatetracyclo[4.4.0.1$^{7,10}$.0$^{2,4}$]undec-8-yl
 9,10,12,13-diepoxystearyl ether,
3-oxatetracyclo[4.4.0.1$^{7,10}$.0$^{2,4}$]undec-8-yl
 2,3-epoxycyclopentyl ether,
3-oxatetracyclo[4.4.0.1$^{7,10}$.0$^{2,4}$]undec-8-yl
 2,3-epoxycyclopentylmethyl ether,
3-oxatetracyclo[4.4.0.1$^{7,10}$.0$^{2,4}$]undec-8-yl
 alkyl substituted 3,4-epoxycyclohexyl ether,
3-oxatetracyclo[4.4.0.1$^{7,10}$.0$^{2,4}$]undec-8-yl
 3,4-epoxycyclohexyl ether,
3-oxatetracyclo[4.4.0.1$^{7,10}$.0$^{2,4}$]undec-8-yl 2,3-epoxycyclohexyl ether,
3 - oxatetracyclo[4.4.0.1$^{7,10}$.0$^{2,4}$]undec - 8 - yl 3,4 - epoxycyclohexylmethyl ether,
3 - oxatetracyclo[4.4.0.1$^{7,10}$.0$^{2,4}$]undec - 8 - yl 6 - methyl-3,4-epoxycyclohexylmethyl ether,
3 - oxatetracyclo[4.4.0.1$^{7,10}$.0$^{2,4}$]undec - 8 - yl 5 - methyl-3,4-epoxycyclohexylmethyl ether,
3 - oxatetracyclo[4.4.0.1$^{7,10}$.0$^{2,4}$]undec - 8 - yl alkyl substituted 3-oxatricyclo[3.2.1.0$^{2,4}$]oct-6-yl ether,
3 - oxatetracyclo[4.4.0.1$^{7,10}$.0$^{2,4}$]undec - 8 - yl 3 - oxatricyclo[3.2.1.0$^{2,4}$]oct-6-yl ether, and the like.

Examples of other monomeric polyepoxides, include
1,4 - bis(2,3 - epoxypropoxy)benzene, 1,3 - bis(2,3 - epoxypropoxy)benzene, 4,4'-bis(2,3-epoxypropoxy)diphenyl ether, 1,8-bis(2,3-epoxypropoxy)octane, 1,4-bis(2,3-epoxypropoxy)cyclohexane, 4,4' - bis(2 - hydroxy - 3,4'-epoxybutoxy)diphenyl dimethylmethane, 1,3-bis(4,5-epoxypentoxy) - 5 - chlorobenzene, 1,4 - bis(3,4 - epoxybutoxy) - 2 - chlorocyclohexane, 1,3 - bis(2 - hydroxy-3,4 - epoxybutoxy)benzene, 1,4 - bis(2 - hydroxy - 4,5-epoxypentoxy)benzene.

Examples of vic-epoxyhydrocarbyl substituted aromatic hydrocarbons and halo-substituted aromatic hydrocarbons include, among others, 1,4-bis(2,3-epoxypropyl)benzene, 1,4 - bis(2,3 - epoxycyclohexyl)benzene, 1,4 - bis(2,3-epoxybutyl)benzene, 1,3 - bis(2,3 - epoxypropyl)benzene, 1,4-bis(2,3-epoxyhexyl)benzene, 1 - (3,4 - epoxypentyl)-4 - (2,3 - epoxypropyl)benzene, 1,2 - di(2,3 - epoxypropyl)benzene, 4,4' - bis(2,3 - epoxypropyl)diphenyl, 1,5-bis(2,3 - epoxypropyl)naphthalene, 2,6 - bis(2,3 - epoxypropyl)naphthalene, 1,4 - bis(2,3 - epoxypropyl) - 2,3,5,6-tetramethyl benzene, and the like.

The epoxidized polymers which can be cured with the stannic catalysts of this invention are polymeric molecules which contain, on the average, at least one vicinal epoxy group, i.e.,

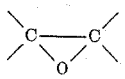

and preferably, a plurality of vicinal epoxy groups. These epoxidized polymers can be prepared by the epoxidation of the corresponding olefinically unsaturated polymer precursor which has an average molecular weight in the range of from about 250 to about 250,000, and higher, preferably from about 250 to about 25,000, and preferably still, from about 500 to about 10,000. The term "average" is to be noted since the individual molecules of a given sample of olefinically unsaturated polymeric product which result from the polymerization reaction of the appropriate monomeric reagent(s), in general, vary in molecular weight (or degree of polymerization). Consequently, the overall molecular weight of the sample is the average of the molecular weight of the individual polymeric molecules which comprise said sample.

In a broad aspect, the epoxidized polymers which are contemplated include, among others, the partially to essentially completely epoxidized polymers of conjugated dienes; the partially to essentially completely epoxidized copolymers of conjugated dienes with olefinic monomers; and the like. The term "polymer" as employed herein including the appended claims, is used in its generic sense to encompass homopolymers and copolymers. It is pointed out, also, that the term "partially to essentially completely epoxidized" (polymers or copolymers) means that the epoxidized polymers which are useful in the invention can range from those which contain, on the average, at least one single vicinal epoxy group and, on the average, a plurality of ethylenic groups to those which contain, on the average, a plurality of vicinal epoxy groups and relatively few, or none, ethylenic groups. As a practical matter, especially from a commercial standpoint, it is somewhat difficult and expensive to fully and completely epoxidize the olefinically unsaturated polymer precursor.

In one aspect, the epoxidized polymers which are contemplated as a component(s) in the novel curable compositions contain at least one percent oxirane oxygen to below about 23 percent oxirane oxygen, and preferably, from about 3 to about 12 percent oxirane oxygen. The term "percent oxirange oxygen" designates the number of grams of oxirane oxygen per 10 grams of a sample of epoxidized polymer. The upper limit regarding the percent oxirane oxygen is a variable which will depend upon the average molecular weight of the olefinically unsaturated polymer precursor, the degree of epoxidation of the olefinically unsaturated polymer precursor, the monomers employed to prepare said precursor, the degree and number of side reactions which can occur during the epoxidation reaction other than that of introducing oxirane oxygen at the site of the ethylenic carbon to carbon double bond of said precursor, and the like. Nevertheless, the invention contemplates the use of essentially completely epoxidized polymers, and consequently, the determination of the upper limit of percent oxirane oxygen is readily determined via ordinary experimentation by a chemist.

However, it must be borne in mind that with regard to the upper limit of percent oxirane oxygen, this limit is a variable governed by practical and readily determined factors such as those illustrated above.

The conjugated dienic monomers which are useful in preparing the non-epoxidized polymers, i.e., the olefinically unsaturated polymer precursors, are characterized by the unit,

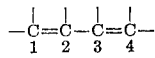

whereas the olefinic monomers are characterized by at least one

unit. It is apparent, therefore, that the olefinic monomer can contain more than one

unit; however, said olefinic monomer is non-conjugated. It is desirable to exclude conjugated dienic monomers which contain so-called negative substituents, e.g., chloro, bromo, and cyano, monovalently bonded to the carbon atoms designated by the numerals 2 and 3 of the unit

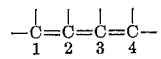

Such conjugated dienic monomers can undergo what is known as 1,4-addition polymerization, e.g., in the homopolymerization of 1,3-butadiene, to yield a polymer containing the unit

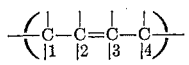

However, the presence of negative groups on the ethylenic carbon atoms of polymers which result from the 1,4-addition route tends to inactivate the ethylenic group toward epoxidation, i.e., the introduction of oxirane oxygen at the site of the resulting carbon to carbon double bond is difficult when negative groups are attached to the ethylenic carbon atoms of the polymer.

Specific illustrative conjugated dienic monomers which are useful in the preparation of the non-epoxidized polymers include, for example, 1,3-butadiene, 1-methyl-1,3-butadiene, 2-methyl-1,3-butadiene, 2-ethyl-1,3-butadiene, 1,1 - dimethyl-1,3-butadiene, 1,4-dimethyl-1,3-butadiene, 2,3-dimethyl-1,3-butadiene, 2-isopropyl-1,3-butadiene, 1-n-propyl-1,3-butadiene, 1-phenyl-1,3-butadiene, 1-ethoxy-1,3-butadiene, 1-acetoxy-1,3-butadiene, 1-allyl-1,3-butadiene, 2 - methyl - 6 - methylene-2,7-octadiene, and the like. Conjugated dienic hydrocarbon monomers which contain from 4 to 8 carbon atoms are preferred in the preparation of the non-epoxidized homopolymers and copolymers. Conjugated butadiene is most preferred.

Exemplary olefinic monomers which are useful in the preparation of the non-epoxidized copolymers include, for instance, ethylene, propylene, isobutylene, butene-1, styrene, vinyltoluene, isopropenylbenzene, 4-vinylcyclohexene, divinylbenzene, vinyl chloride, allyl chloride, alphamethylstyrene, alpha-chlorostyrene, 2,5-dichlorostyrene, 4-cyanostyrene, 2-hydroxystyrene, 2-acetoxystyrene, chlorotrifluoroethylene, vinylidene chloride, vinyl fluoride, vinylidene fluoride, vinyl bromide, methyl acrylate, methyl methacrylate, ethyl methacrylate, octyl methacrylate, methyl crotonate, butyl crotonate, ethyl crotonate, dimethyl maleate, dibutyl maleate, dioctyl maleate, diethyl chloromaleate, diethyl fumarate, vinyl acetate, vinyl butyrate, vinyl 2-ethylhexanoate, vinyl stearate, vinyl oleate, vinyl linoleate, vinyl benzoate, vinyl crotonate, allyl acetate, acrylonitrile, methylacrylonitrile, acrylamide, methacrylamide, crotonamide, N-vinylbenzamide, N-vinylbutyramide, methyl vinyl ketone, methyl isopropenyl ketone, acrolein, vinyl ethyl ether, vinyl butyl ether, 2-vinylpyridine, N-vinylcarbazole, and the like. Preferred olefinic monomers include the alkenes, the phenyl substituted-alkenes, the olefinically unsaturated organic esters, the olefinically unsaturated amides, the olefinically unsaturated nitriles, and the like. Styrene, the lower alkyl acrylates, and the alkenes which contain up to 5 carbon atoms are most preferred.

The preparation of the non-epoxidized homopolymers and copolymers is well documented in the literature. For example, U.S. Patents 2,500,933, 2,586,594 and 2,631,175 are illustrative of the reagents and modes for preparing various non-epoxidized polymers. Liquid polybutadiene which has an average molecular weight of at least 250 is highly preferred.

The preparation of the epoxidized polymers which are employed as a component(s) in the novel curable, polymerizable compositions can be accomplished by epoxidizing the corresponding olefinically unsaturated homopolymer or copolymer precursors such as those exemplified previously with well known epoxidizing agents, and preferably with organic peracids. Since the epoxidation reaction is carried out in a liquid phase, practical considerations are readily suggested to the chemist skilled in the epoxy art. Thus, if the olefinically unsaturated homopolymer or copolymer precursor is a liquid, then an inert normally liquid organic solvent is not essential, though one can be employed if desired. However, if the unsaturated homopolymer or copolymer precursor is a solid, then said solid precursor should be soluble in an inert normally liquid organic vehicle in order for it to undergo effective epoxidation. Inert organic vehicles such as chloroform, toluene, benzene, ethylbenzene, xylene, acetone, methyl ethyl ketone, butyl acetone, ethyl acetate, and the like, are illustrative of the common solvents which may be employed. The particular homopolymer or copolymer precursor, its degree of polymerization, i.e., its average molecular weight, its preparation, and other factors, will influence, to a large extent, the solubility of said precursor in any given inert normally liquid organic vehicle. It is readily recognized by polymer chemists that many highly polymerized compounds are solids of extremely limited solubility in otherwise useful inert organic media, and in this respect, a practical upper limit is imposed on the degree of polymerization of the olefinically unsaturated homopolymer or copolymer precursor. Thus, the solid non-epoxidized olefinically unsaturated polymers which are contemplated are soluble in an inert normally liquid vehicle, the choice of said inert normally liquid vehicle being readily determined by the merest of routine experimentation by the artisan in the epoxy art.

Other useful polyepoxides includes epoxides derived from natural oils, such as linseed oil epoxide, soybean oil epoxide, safflower oil epoxide, tung oil epoxide, castor oil epoxide, lard oil epoxide, and the like, which are glycerides containing 45 to 80 carbon atoms.

The stannic catalysts of the instant invention can also be employed to cure monoepoxides, i.e., compounds containing only one vicinal epoxy group, which may be present as part of a cycloaliphatic nucleus or part of an aliphatic chain. Typical monoepoxide compounds include ethylene oxide, propylene oxide, 1,2-epoxyoctane, cyclohexene oxide, 1,2-epoxypropyl benzene, and the like.

It should be noted that the aforementioned epoxides are given only for purposes of illustrating the wide variety of monoepoxides and polyepoxides which can be cured by the catalysts of the instant invention and no unnecessary limitations are to be inferred therefrom.

The epoxides with the stannic catalyst of the type illustrated above can be homopolymerized or copolymerized with an active organic hardener or combination of active organic hardeners. By the term "active organic hardener," as used herein, is meant an organic compound which contains two or more groups which are reactive with epoxy groups. The active organic hardeners illustrated hereinafter are employed in a curing amount, that is, an amount which is sufficient to cause the epoxide system containing the active organic hardener(s) to become polymerized. The active organic hardeners can also be employed in varying amounts so as to give a wide variety of properties to the cured epoxide system. Typical groups which are reactive with epoxy groups are active hydrogen groups such as hydroxyl groups, carboxyl groups, amino groups, thiol groups, and the like; and isocyanate groups, isothiocyanate groups, halide atoms of acyl halides, and the like. Oxydicarbonyl groups such as those contained by polycarboxylic acid anhydrides are also active with epoxy groups. One oxydicarbonyl group will react with two epoxy groups and, in this connection, polycarboxylic acid anhydrides need only contain one oxydicarbonyl group in order to function as an active organic hardener with the epoxide compositions of this invention. Stated differently, one oxydicarbonyl group of an anhydride is equivalent to two epoxy-reactive groups.

Representative active organic hardeners include polyfunctional amines, polycarboxylic acid, polycarboxylic polyacid anhydrides, polyols, i.e., polyhydric phenols and polyhydric alcohols, polythiols, polyisocyanates, polythioisocyanates, polyacyl halides and others. By the term "polyfunctional amine," as used herein, is meant an amine having at least two active amino hydrogen atoms which can be on the same nitrogen atom or different nitrogen atoms.

Resins having particularly valuable properties can be formed from mixtures containing the epoxide compositions and polyfunctional amines in such relative proportions as provide from 0.2 to 5.0 amino hydrogens of the amine for each epoxy group contained by said epoxide composition. It is preferred to form resins from curable mixtures containing the epoxide compositions and polyfunctional amines which provide from 0.3 to 3.0 amino hydrogens for each epoxy group.

Among the polyfunctional amines contemplated as active organic hardeners include the aliphatic amines, aromatic amines, aralkyl amines, cycloaliphatic amines, alkaryl amines, aliphatic polyamines including polyalkylene polyamines, amino-substituted aliphatic alcohols and phenols, polyamides, addition products of polyamines and low molecular weight epoxides containing oxirane oxygen linked to vicinal carbon atoms, and others.

Typical aliphatic amines include methylamine, ethylamine, propylamine, isopropylamine, butylamine, isobutylamine, 2-ethylhexylamine, 3-propylheptylamine, and the like.

Examples of aromatic amines, aralkyl amines and alkaryl amines include, among others, aniline, o-hydroxyaniline, m-toluidine, 2,3-xylidine, benzylamine, phenethylamine, 1-naphthylamine, meta-, ortho-, and paraphenylenediamines, 1,4-naphthalenediamine, 3,4-toluenediamine and the like.

Illustrative cycloaliphatic amines include cyclopentylamine, cyclohexylamine, p-methane-1,8-diamine and others.

Among the polyamides, i.e., those having an average molecular weight range from about 300 to about 10,000, include condensation products of polycarboxylic acids, in particular, hydrocarbon dicarboxylic acids such as malonic acid, succinic acid, glutaric acid, adipic acid, dilinolenic acid, and the like, with polyamines, particularly diamines, such as ethylenediamine, propylenediamine and the like.

Aliphatic polyamines include ethylenediamine, propylenediamine, butylenediamine, pentylenediamine, ylenediamine, octylenediamine, nonylenediamine, decylenediamine, and the like. Polyalkylene polyamines such as diethylenetriamine, triethylenetetramine, tetraethylpentamine, dipropylenetriamine, and the like, are particularly suitable.

The amino-substituted aliphatic alcohols and phenols suitable for use in the present invention are illustrated by 2-aminoethanol, 2-aminopropanol, 3-aminobutanol, 1,3-diamino-2-propanol, 2-aminophenyl, 4-aminophenyl, 2,3-diaminoxylenol and the like.

Other illustrations of polyfunctional amines are the addition products of polyamines, in particular, diamines and triamines and epoxides containing oxirane oxygen linked to vicinal carbon atoms, such as ethylene oxide, propylene oxide, butadiene dioxide, diglycidyl ether, epoxidized soybean oil, epoxidized safflower oil, and polyglycidyl polyethers, such as those prepared from polyhydric phenols and epichlorohydrin. Particularly useful polyfunctional amines are the mono- and polyhydroxyalkyl polyalkylene and arylene polyamines which can be prepared by the addition reaction of polyalkylene polyamines, arylene polyamines, and the like, e.g., ethylenediamine, propylenediamine, diethylenetriamine, hexamethylenediamine, triethylenetetramine, tetraethylenepentamine, phenylenediamine, methylenedianiline, xylenediamine, and the like with ethylene oxide or propylene oxide such that the resulting amine adduct contains two or more active hydrogen atoms attached to either one or more amino nitrogen atoms.

Examples of still other polyfunctional amines suitably adaptable include, among others, heterocyclic nitrogen compounds such as piperazine, 2,5-dimethylpiperazine, and the like; aminoalkyl-substituted heterocyclic compounds such as N-(aminopropyl)morpholine, N-(aminoethyl)morpholine, and the like; amino-substituted heterocyclic nitrogen compounds such as melamine, 2,4-diamino-6-(aminoethyl)pyrimidine, and the like; dimethylurea, guanidine, p,p′-sulfonyldianiline, 3,9-bis(aminoethyl) spirobimetadioxane, hexahydrobenzamide, and others.

Other polyfunctional amines having a total of at least two active amino hydrogen atoms to the molecule can be employed in the epoxide compositions of this invention. For example, such polyfunctional amines as mixtures of p,p′-methylenedianiline and m-phenylenediamine, or other mixtures of two or more polyfunctional amines can be used.

Another class of active organic hardeners which can be reacted with the epoxide compositions above, are the polycarboxylic acids. By the term "polycarboxylic acid," as used herein, is meant a compound or polymer having two or more carboxyl groups to the molecule. Curable mixtures can be formed from the epoxide compositions and polycarboxylic acids, which mixtures can be cured to produce a wide variety of useful products. Valuable resins can be made from mixtures containing such amounts of an epoxide composition and polycarboxylic acid as to provide 0.3 to 1.25 carboxyl groups of the acid for each epoxy group contained by the amount of the epoxide composition. It is preferred, however, to make resins from curable mixtures which contain such amounts of polycarboxylic acids and epoxide compositions as to provide 0.3 to 1.0 carboxyl groups of the acid for each epoxy groups from the epoxide composition.

Representative polycarboxylic acids include oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alpha-hydromuconic acid, beta-hydromuconic acid, diglycollic acid, dilactic acid, thiodiglycollic acid, 4-amyl-2,5-heptadienedioic acid, 3-hexynedioic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorophthalic acid, 1,8-naphthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5-benzenetetracarboxylic acid, benzenepentacarboxylic acid, benzenehexacarboxylic acid, polymerized fatty acids derived from natural oils, e.g., linseed oil, tung oil, soybean oil, dehydrated castor oil, etc., including mixtures thereof, which have a molecular weight within the range of 500 to 5000, and the like, such as the dimer and trimer acids of commerce.

Also, as polycarboxylic acids useful in the polymerizable compositions there are included compounds containing ester groups in addition to two or more carboxy groups which can be termed polycarboxy polyesters of polycarboxylic acids, such as those listed above, or the corresponding anhydrides of said acids, esterified with polyhydric alcohols. Stated in other words, by the term "polycarboxy polyesters," as used herein, is meant polyesters containing two or more carboxy groups per molecule. These polycarboxy polyesters can be prepared by known condensation procedures, employing mol ratios favoring greater than equivalent amounts of polycarboxylic acid, or anhydride. More specifically, the amount of polycarboxylic acid, or anhydride, employed in the esterification reaction should contain more carboxy groups than are required to react with the hydroxyl groups of the amount of polyhydric reactant.

Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, pentane-1,5-diol, pentane-2,4-diol, 2,2-dimethyltrimethylene glycol hexane-1,4-diol, hexane-1,5-diol, hexane-1,6-diol, hexane-2,5-diol, 3-methylpentane-1,5-diol 2-methylpentane-2,5-diol, 3-methylpentane-2,5-diol, 2,2-diethylpropane-1,3-diol, 2,2-diethylhexane-1,3-diol, 2,5-dimethylhexane-2,5-diol, octadecane-1,12-diol, 1-butene-3,4-diol, 2-butene-1,4-diol, 2-butyne-1,4-diol, 2,5-dimethyl-3-hexyne-2,5-diol and the like; trihydric alcohols such as glycerol, trimethylolethane, hexane-1,2,6-triol, 1,1,1-trimethylolpropane and the ethylene oxide and propylene oxide adducts thereof; tetrahydric compounds such as pentaerythritol, diglycerol, and the like; and higher polyhydric compounds such as pentaglycerol, dipentaerythritol, polyvinyl alcohols and the like. Additional polyhydric alcohols useful in making polycarboxy polyesters can be prepared by the reaction of epoxides, e.g., diglycidyl diethers of 2,2-propane bisphenol, and reactive hydrogen-containing organic compounds, e.g., amines, polycarboxylic acids, polyhydric compounds and the like. In forming the polycarboxy polyesters, it is preferable to use a dihydric, trihydric or tetrahydric aliphatic or oxaaliphatic alcohol. The mol ratios in which the polycarboxylic acid or anhydride can be reacted with polyhydric alcohols in preparing polycarboxylic polyesters useful in the compositions are those which provide polyesters having more than one carboxy group per molecule.

Curable mixtures containing the epoxide compositions and polycarboxylic acid anhydrides can also be employed to produce resins having diversified and valuable properties. Particularly valuable resins can be made from mixtures containing such amounts of polycarboxylic acid anhydride and epoxide compositions as to provide 0.2 to 3.0 carboxy equivalents of the anhydride for each epoxy group of the epoxide composition. It is preferred, however, to make resins from curable mixtures which contain such amounts of polycarboxylic acid anhydride and epoxide composition as to provide 0.4 to 2.0 carboxy equivalents of anhydride for each epoxy group contained by the amount of epoxide concentration.

Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride, hexahydrophthalic anhydride, hexachlorphthalic anhydride, tetrahydrophthalic anhydride, methyltetrahydrophthalic anhydride, tetrachlorphthalic anhydride; hexachloroendomethylene-tetrahydrophthalic anhydride, otherwise known as chlorendic anhydride, tetrabromophthalic anhydride, tetraiodophthalic anhydride; phthalic anhydride, 4-nitrophthalic anhydride, 1,2-naphthalic anhydride; polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in our polymerizable compositions include the Diels-Alder adducts of maleic acid and alicyclic compounds having conjugated double bonds, e.g., methylbicyclo[2.2.1]heptene-2,3-dicarboxylic anhydride.

Thermoset resins can be prepared from mixtures containing the epoxide compositions and polyols by providing 0.1 to 2.0, preferably from 0.2 to 1.5, hydroxyl groups of the polyol for each epoxy group contained by the amount of the epoxide composition. By the term "polyol," as used herein, is meant an organic compound having at least two hydroxyl groups which are alcoholic hydroxyl groups, phenolic hydroxyl groups, or both alcoholic and phenolic hydroxyl groups. The epoxide composition and polyol can be mixed in any convenient manner. A preferred method, however, is to mix the polyol and epoxide composition in the liquid state so as to obtain a uniform mixture. In forming this mixture, it may be necessary to raise the temperature of the polyol and epoxide composition to at least the melting point or melting point range of the highest melting component. Temperatures below about 150° C. are preferred so as to avoid possible premature curing of these curable mixtures. Stirring also aids the formation of a homogeneous mixture.

Representative polyols include ethylene glycol, diethylene glycol, polyethylene glycols, propylene glycol, dipropylene glycol, polypropylene glycols, trimethylene glycols, butanediols, pentanediols, 12,13-tetracosanediol, glycerol, polyglycerols, pentaerythritol, sorbitol, polyvinyl alcohols, cyclohexanediols, inositol, dihydroxytoluenes, resorcinol, catechol, bis(4-hydroxyphenyl)-2,2-propane, bis(4-hydroxyphenyl)methane, and the ethylene and propylene oxide adducts thereof, etc.

The stannic mercaptide catalysts of this invention are particularly effective in accelerating the reaction of the epoxides with polyhydric phenols, such as the bisphenols referred to above as well as novolaks and resole phenolic resins.

The following examples illustrate the best mode now contemplated for carrying out the invention.

In the following examples the examination or description of the resins were conducted at room temperature, i.e., about 22° C. Barcol hardness values were determined by the use of Barcol Impressor GYZJ-934-1 at room temperature. All the experiments in Tables I-III were conducted in test tubes under nitrogen. Unless otherwise indicated all resins were cured for 22 hours at 150° C.

EXAMPLES 1-21

In the following examples, various proportions of 3,4-epoxy-6-methylcyclohexylmethyl 3,4-epoxy-6-methylcyclohexanecarboxylate were mixed with stannic t-heptyl mercaptide and stannic n-octyl mercaptide catalysts and various active organic hardeners.

The procedure for testing the stannic mercaptides with the epoxide and various hardeners, as summarized in Table I, was as follows: In general, the epoxide and hardener were mixed at room temperature, warmed to the minimum temperature necessary for solution to occur, and catalyst added. After bringing the contents of the tubes to 150° C., the tubes were closed and placed in the oven at this temperature. In every case, the catalysts caused the liquid mixtures to gel more rapidly (or give more viscous liquids) and produce harder resins than the control. In all experiments, the total resin charge was 23 grams and 0.23 gram of stannic mercaptide (1.0 percent) was used.

EXAMPLES 22–35

The following examples demonstrate the effectiveness of the stannic mercaptide catalysts for the homopolymerization of the diglycidyl ether of bisphenol A and its copolymerization with various hardeners. The catalyst was added to a homogeneous solution as before and the curing was performed at the temperature and for the periods indicated, the results being given in Table II.

TABLE I

| Example No. | Epoxide,[c] gms. | Hardener Name | Hardener Gms. | Catalyst $Sn(SC_7H_{15}-t)_4$, gms. | Catalyst $Sn(SC_8H_{17}-n)_4$, gms. | Ratio[a] | Gel Time, at 150° C. | Barcol[b] | Remarks |
|---|---|---|---|---|---|---|---|---|---|
| 1 | 20 | 1,2,6-hexanetriol | 2.92 | .23 | | 1:0.5 | 6–22 hrs | 5 | |
| 2 | 20 | ----do---- | 2.92 | | .23 | 1:0.5 | 5.5–6 hrs | 15 | |
| 3 | 20 | ----do---- | 2.92 | | | 1:0.5 | No gel | | Liq. at rm. temp. |
| 4 | 16.6 | Bisphenol A | 6.25 | .23 | | 1:0.5 | 0–5 mins | 42 | |
| 5 | 16.6 | ----do---- | 6.25 | | .23 | 1:0.5 | 0–7 mins | 37 | |
| 6 | 16.6 | ----do---- | 6.25 | | | 1:0.5 | No gel | 0 | Liq. at 150° C. but solid at room temp. |
| 7 | 14.5 | Methyl Nadic Anhydride.[d] | 8.5 | .23 | | 1:1 | 3–3.5 hrs | 34 | |
| 8 | 14.5 | Methyl Nadic Anhydride. | 8.5 | | .23 | 1:1 | 17–27 mins | 43 | |
| 9 | 14.5 | ----do---- | 8.5 | | | 1:1 | 6–22 hrs | 43 | |
| 10 | 14.7 | Tolylenediisocyanate | 8.3 | .23 | | 1:1 | 3–3.5 hrs | 0 | |
| 11 | 14.7 | ----do---- | 8.3 | | .23 | 1:1 | 35–50 mins | 25 | |
| 12 | 14.7 | ----do---- | 8.3 | | | 1:1 | 6–22 hrs | 0 | |
| 13 | 17.3 | Sebacic Acid | 5.7 | .23 | | 1:0.5 | 0–2 mins | 24 | |
| 14 | 17.3 | ----do---- | 5.7 | | .23 | 1:0.5 | 0–2 mins | 23 | |
| 15 | 17.3 | ----do---- | 5.7 | | | 1:0.5 | 15–20 mins | 7 | |
| 16 | 11.5 | Dimer Acid[e] | 11.5 | .23 | | 1:1 | 0–4 mins | 0 | |
| 17 | 11.5 | ----do---- | 11.5 | | .23 | 1:1 | 5–7 mins | 0 | |
| 18 | 11.5 | ----do---- | 11.5 | | | 1:1 | 6–22 hrs | 0 | |
| 19 | 23 | | | .23 | | | | | Sticky grease-like semi-solid at rm. temp. |
| 20 | 23 | | | | .23 | | 6–22 hrs | 0 | Rubbery resin. |
| 21 | 23 | | | | | | | | Viscous liquid at rm. temp. |

[a] Ratio of epoxide to reactive or functional group.
[b] Barcol Impressor GYZJ934–1 used to determine Barcol No.
[c] 3,4-epoxy-6-methylcyclohexylmethyl 3,4-epoxy-6-methylcyclohexanecarboxylate.
[d] Methylbicyclo-[2.2.1]heptene-2,3-dicarboxylic anhydride.
[e] Emery Empol 1022 Dimer Acid; 578 mol. wt. neutralization equivalent=300.

TABLE II

| Example No. | Epoxide,[f] gms. | Hardener Name | Hardener gms. | $Sn(SC_7H_{15}-t)_4$, gms. | Ratio[a] | Gel Time at 150° C. | Cure, hrs. at 150° C. | Barcol[b] | Remarks |
|---|---|---|---|---|---|---|---|---|---|
| 22 | 20 | 1,2,6-hexanetriol | 2.34 | .23 | 1:0.5 | | 22 | 0 | Liq. at 150° C. but solid at room temp. |
| 23 | 20 | ----do---- | 2.34 | | 1:0.5 | | 22 | | Liq. at rm. temp. |
| 24 | 15.7 | Methyl Nadic Anhydride[g] | 7.3 | .23 | 1:1 | 3–3.25 hrs | 22 | 35 | |
| 25 | 15.7 | ----do---- | 7.3 | | 1:1 | 6–22 hrs | 22 | 0 | Rubbery. |
| 26 | 18.2 | Tolylenediisocyanate | 4.12 | .23 | 1:0.5 | 81–96 mins.[c] | [c] 22 | 20 | |
| 27 | 18.2 | ----do---- | 4.12 | | 1:0.5 | 4.5–5 hrs.[c] | [c] 22 | 0 | |
| 28 | 17.73 | 4,4'-diaminodiphenyl | 4.61 | [d] .23 | 1:1 | 2.5–2.75 [e] | [c] 22 | 25 | |
| 29 | 17.73 | ----do---- | 4.61 | | 1:1 | 3.5–3.75 [e] | [c] 22 | 28 | |
| 30 | 12.8 | Dimer acid[h] | 10.2 | .23 | 1:0.5 | 3–3.5 hrs.[c] | [c] 22 | 0 | Rubbery resin. |
| 31 | 12.8 | ----do---- | 10.2 | | 1:0.5 | 6–22 hrs.[c] | [c] 22 | | Soft rubbery resin. |
| 32 | 19.1 | Bisphenol A | 5.6 | .23 | 1:0.5 | 6–22 hrs | 22 | 19 | |
| 33 | 19.1 | ----do---- | 5.6 | | 1:0.5 | 6–22 hrs | 22 | 0 | Very brittle resin. |
| 34 | 23 | | | .23 | | | 22 | | Tacky, hard grease at room temp. |
| 35 | 23 | | | | | | 22 | | Viscous liquid at room temp. |

[a] Ratio of epoxide to reactive or functional groups.
[b] Barcol Impressor GYZJ934–1 used to determine Barcol No.
[c] 160° C.
[d] $Sn(SC_8H_{17}-n)_4$ used.
[e] Gel time at 40–55° C.
[f] Diglycidyl ether of bisphenol A.
[g] Methylbicyclo-[2.2.1]heptene-2,3-dicarboxylic anhydride.
[h] Emery Empol 1022 Dimer acid, 578 mol. wt., neutralization equivalent=300.

EXAMPLES 36–49

The following examples demonstrate the effectiveness of the stannic mercaptide catalysts with various types of polyepoxides and an anhydride hardener. The catalyst was added to a homogeneous solution as before and the curing was performed at the temperature and for the periods indicated; the results being given in Table III.

was obtained 41 grams of stannic n-octyl mercaptide which had the following analysis. Calculated for stannic n-octyl mercaptide: Sn, 16.96; C, 54.9; H, 9.79; S, 18.33; Found: Sn, 17.8; C, 54.8; H, 9.62; S, 22.27.

In a similar manner other stannic mercaptides can be prepared by an exchange reaction of stannic t-amyloxide with methanethiol, prepanethiol, isopropanethiol, tridecanethiol and the like.

TABLE III

| Example No. | Epoxide [c] | Gms. | Methyl Nadic Anhydride,[a] gms. | $Sn(SC_7H_{15}-t)_4$, gms. | Gel Time at 150° C. | Barcol [b] | Remarks |
|---|---|---|---|---|---|---|---|
| 36 | A | 11.7 | 11.7 | 0.23 | 7–22 hrs | 0 | |
| 37 | A | 11.7 | 11.7 | | | 0 | Viscous liquid at room temp. |
| 38 | B | 10.1 | 12.9 | 0.23 | 5–7 mins | 20 | |
| 39 | B | 10.1 | 12.9 | | 1.5–2.5 hrs | 31 | Brittle. |
| 40 | C | 11 | 12 | 0.23 | 7–22 hrs | 0 | |
| 41 | C | 11 | 12 | | | 0 | Viscous grease at room temp. |
| 42 | D | 16.7 | 6.3 | 0.23 | 16–19 mins | 21 | |
| 43 | D | 16.7 | 6.3 | | 6–22 hrs | 0 | |
| 44 | E | 17.7 | 5.3 | 0.23 | 7–22 hrs | 0 | Rubbery resin. |
| 45 | E | 17.7 | 5.3 | | | | Viscous liquid at room temp. |
| 46 | F | 16.8 | 6.2 | 0.23 | 22–26 mins | 45 | |
| 47 | F | 16.8 | 6.2 | | 2.75–3.75 hrs | 38 | |
| 48 | G | 16.3 | 6.7 | 0.23 | 88–93 mins | 37 | |
| 49 | G | 16.3 | 6.7 | | 4–4.25 hrs | 37 | |

[a] Epoxide to carboxyl was 1:1 in all cases.
[b] Barcol Impressor GYZJ934-1 was used to determine Barcol No.
[c] Epoxide A = bis-(2,5-epoxycyclopentyl)ether.
Epoxide B = vinylcyclohexene dioxide.
Epoxide C = dicyclopentadiene dioxide.
Epoxide D = bis(3,4-epoxy-6-methylcyclohexylmethyl) adipate.
Epoxide E = soybean oil epoxide.
Epoxide F = 1,2,3-propanetriol tris-(3,4-epoxyclyohexanecarboxylate).
Epoxide G = 1,1,1-trimethylolpropane tris-(3,4-epoxycyclohexanecarboxylate).

EXAMPLE 50

*Preparation of stannic t-heptyl mercaptide*

To a 500 cubic centimeter flask equipped with a 1 inch by 18 inch column were added 500 grams of toluene. The contents of the flask were heated and approximately 50 grams of toluene taken off overhead to remove traces of water. Thereafter 30.9 grams of t-heptyl mercaptan were added and the mixture maintained at approximately 108° C. 25 grams of stannic t-amyloxide were then added and the mixture refluxed for about 15 minutes at a head temperature of 98° C. Toluene and t-amyl alcohol were then distilled off over a three hour period in three fractions of 56, 25 and 341 grams respectively while the head temperature was maintained between 98° and 108° C. Analysis of the first two fractions did not disclose the presence of any t-heptyl mercaptan. Thereafter the remainder was stripped in a Rinco evaporator for 2 hours at 150° C. and at a pressure of 1 millimeter of mercury whereupon 34 grams of stannic t-heptyl mercaptide, a turbid yellowish viscous liquid, were obtained. Analysis of the liquid indicated the following. Calculated for stannic t-heptyl mercaptide: Sn, 18.43; C, 52.23; H, 9.39; S, 19.92; Found: Sn, 18.9; C, 52.09; H, 9.22; S, 21.92. Specific gravity: 1.120.

EXAMPLE 51

*Preparation of stannic n-octyl mercaptide*

To a 500 cubic centimeter flask equipped with a 1 inch by 18 inch column were added 500 grams of toluene. The contents of the flask were heated and approximately 50 grams of toluene taken off overhead to remove traces of water. Thereafter 34.4 grams of n-octyl mercaptan and 25 grams of stannic t-amyloxide were added and the mixture refluxed. Toluene and t-amyl alcohol were then distilled off over a three and one half hour period in three fractions of 66, 52 and 331 grams respectively while the head temperature was maintained between 96° and 108° C. Analysis of the first two fractions did not disclose the presence of any n-octyl mercaptan. Thereafter, the remainder was stripped in a Rinco evaporator at 150° C. for 2 hours and at 160° C. for an additional 2 hours, at a pressure of 1 millimeter of mercury. There Although the invention has been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What is claimed is:
1. A curable composition comprising:
   (1) a polyepoxide compound selected from the group consisting of cycloaliphatic polyepoxides containing at least one oxirane group which is bonded to two vicinal cycloaliphatic carbon atoms which form a portion of a cycloaliphatic hydrocarbon nucleus containing from 4 to 8 carbon atoms, a bis(vicinal epoxyhydrocarbyl) substituted aromatic hydrocarbon, and epoxidized homopolymers of conjugated dienic hydrocarbons and epoxidized copolymers of said dienic hydrocarbon monomers with vinyl hydrocarbon monomers, said epoxide homopolymers and copolymers containing below about 23 percent oxirane oxygen, and
   (2) a stannic mercaptide.
2. The cured composition of claim 1.
3. A curable composition comprising:
   (1) a cycloaliphatic polyepoxide containing at least one oxirane group which is bonded to vicinal cycloaliphatic carbon atoms which form a portion of a cycloaliphatic hydrocarbon nucleus containing from 4 to 8 carbon atoms, and
   (2) a catalytic amount of a compound of the formula

$$Sn(SR)_4$$

wherein R is a monovalent hydrocarbon radical of from 1 to 18 carbon atoms.
4. The curable composition of claim 3 containing a catalytic amount of stannic n-octyl mercaptide.
5. A curable composition comprising:
   (1) an epoxidized polymer of a conjugated dienic hydrocarbon monomer containing 4 to 8 carbon atoms, said epoxidized polymer containing less than 23 percent by weight oxirane oxygen, and (2) a catalytic amount of a compound of the formula $$Sn(SR)_4$$

wherein R is a monovalent hydrocarbon radical of from 1 to 18 carbon atoms.

6. The curable composition of claim 5 containing a catalytic amount of stannic n-octyl mercaptide.

7. The composition of claim 5 wherein said conjugated dienic hydrocarbon monomer is butadiene.

8. A curable composition comprising:
(1) an epoxidized copolymer of a conjugated dienic hydrocarbon monomer containing from 4 to 8 carbon atoms and an olefinic monomer selected from the group consisting of alkenes, phenyl substituted alkenes, and olefinically unsaturated organic esters, amides and nitriles.

9. The curable composition of claim 8 wherein said conjugated dienic hydrocarbon monomer is butadiene.

10. The curable composition of claim 9 wherein said olefinic monomer is styrene.

11. A curable composition comprising an epoxidized liquid polybutadiene polymer having an average molecular weight of at least 250 and a catalytic amount of a compound of the formula $$Sn(SR)_4$$

wherein R is a monovalent hydrocarbon radical of from 1 to 18 carbon atoms.

12. A curable composition comprising a polyepoxide containing at least one oxirane group which is bonded to two vicinal cycloaliphatic carbon atoms which together with said oxirane oxygen form a cyclohexene structure and a catalytic amount of a compound of the formula $$Sn(SR)_4$$

wherein R is a monovalent hydrocarbon radical of from 1 to 18 carbon atoms.

13. A curable composition comprising:
(1) a cycloaliphatic polyepoxide containing at least one oxirane group which is bonded to vicinal cycloaliphatic carbon atoms which form a portion of a cycloaliphatic hydrocarbon nucleus containing from 4 to 8 carbon atoms,
(2) a catalytic amount of a compound of the formula $$Sn(SR)_4$$

wherein R is a monovalent hydrocarbon radial of from 1 to 18 carbon atoms, and
(3) an active hardener selected from the group consisting of polyfunctional amines, polycarboxylic acids, polycarboxylic acid anhydrides, polyhydric phenols, polyhydric alcohols, polythiols, polyisocyanates, polythioisocyanates and polyacylhalides.

14. A curable composition comprising a polyepoxide containing at least one oxirane group which is bonded to two vicinal cycloaliphatic carbon atoms which together with said oxirane oxygen form a cyclohexene structure and a catalytic amount of a compound of the formula $$Sn(SR)_4$$

wherein R is a monovalent hydrocarbon radical of from 1 to 18 carbon atoms, and an active organic hardener selected from the group consisting of polyfunctional amines, polycarboxylic acids, polycarboxylic acid anhydrides, polyhydric phenols, polyhydric alcohols, polythiols, polyisocyanates, polythioisocyanates and polyacylhalides.

15. A curable composition comprising an epoxycyclohexylalkylepoxycyclohexane carboxylate, and a catalytic amount of a compound of the formula $$Sn(SR)_4$$

wherein R is a monovalent hydrocarbon radical of from 1 to 18 carbon atoms.

16. The curable composition of claim 15 which contains a catalytic amount of stannic n-octyl mercaptide.

17. A curable composition comprising an epoxycyclohexylalkylepoxycyclohexane carboxylate, a catalytic amount of a compound of the formula $$Sn(SR)_4$$

wherein R is a monovalent hydrocarbon radical of from 1 to 18 carbon atoms, and an organic hardener selected from the group consisting of polyfunctional amines, polycarboxylic acids, polycarboxylic acid anhydrides, polyhydric phenols, polyhydric alcohols, polythiols, polyisocyanates, polythioisocyanates and polyacylhalides.

References Cited by the Examiner

UNITED STATES PATENTS

| | | | |
|---|---|---|---|
| 2,054,099 | 9/1936 | Rothrock | 260—2 |
| 2,726,227 | 12/1955 | Leistner et al. | 260—45.75 |
| 2,767,158 | 10/1956 | Schlenker et al. | 260—47 |
| 2,912,448 | 11/1959 | Ramsden | 260—429.7 |
| 2,933,459 | 4/1960 | Gurgiolo | 260—2 |
| 2,934,505 | 4/1960 | Gurgiolo | 260—2 |
| 2,934,548 | 4/1960 | Fath | 260—429.7 |
| 2,977,379 | 3/1961 | Dorfelt et al. | 260—429.7 |
| 3,030,316 | 4/1962 | Bailey | 260—2 |
| 3,117,099 | 1/1964 | Proops et al. | 260—2 |

FOREIGN PATENTS 806,188 12/1958 Great Britain.

WILLIAM H. SHORT, *Primary Examiner.*

HAROLD N. BURSTEIN, *Examiner.*

A. L. LIBERMAN, T. D. KERWIN,
*Assistant Examiners.*